United States Patent [19]
Gosney

[11] 3,819,958
[45] June 25, 1974

[54] CHARGE TRANSFER DEVICE ANALOG MATCHED FILTER

[75] Inventor: William Milton Gosney, Richardson, Tex.

[73] Assignee: Texas Instruments, Incorporated, Dallas, Tex.

[22] Filed: Nov. 3, 1972

[21] Appl. No.: 303,440

[52] U.S. Cl. .......... 307/304, 307/221 D, 317/235 G, 333/70 T
[51] Int. Cl. .......... H01l 19/00
[58] Field of Search. 317/235 G; 307/221 C, 221 D, 307/304; 333/70 T

[56] References Cited

OTHER PUBLICATIONS

Philips Technical Review, "The 'Bucket-Brigade Delay Line' a Shift Register for Analogue Signals" by Sangster, 1970, pages 92–110.

*Primary Examiner*—Jerry D. Craig
*Attorney, Agent, or Firm*—Harold Levine; James Comfort; Richard Donaldson

[57] ABSTRACT

A bridge detector for measuring the charge stored in each delay stage of a charge transfer device analog matched filter, and weighting the tapped signals with a preselected value of unity or less is disclosed. The bridge detector includes two clock lines commonly connected at one end to one phase of a multiphase clock source, the other ends respectively connected to different portions of a split transfer electrode in each delay stage, the relative area ratio of the two portions defining the weighting for that stage. A differential amplifier measures the voltage across the two clock lines.

8 Claims, 4 Drawing Figures

CHARGE TRANSFER DEVICE ANALOG MATCHED FILTER

The present invention pertains to charge transfer devices in general, and more particularly to charge transfer device analog matched filters and means for detecting and weighting signal at various delay stages therein.

Charge transfer devices are metal-insulator-semiconductor devices which belong to a general class of semiconductor charge devices which store and transfer information in the form of electrical charge. Charge transfer devices include both charge-coupled devices (CCD) and bucket-brigades (BB). The charge-coupled devices are distinguished by the property that the semiconductor portion of the devices is, for the most part, homogeneously doped regions of different conductivity being required only for injecting or extracting charge. A typical semiconductor CCD shift register is described, for example, in Boyle et al, Bell System Technical Journal, 49,587 (1970). In the shift register, a DC bias sufficient to invert the semiconductor surface is applied between electrodes and the semiconductor material and clocking pulses are applied sequentially to the electrodes. Because of the inversion, semiconductor surface minority carriers are drawn to the semiconductor-insulator interface and tend to collect in the potential wells under the electrodes. When the clocking pulses are sufficiently large, the minority carriers migrate from the area under one electrode to the area under the next following a potential well produced by the clocking pulses.

A bucket-brigade charge transfer device shift register is in essence a row of insulated gate field effect transistors with source and drains connected and with the gates capacitively coupled to the drains. The BB shift register operates in a two transfer mode. In the storage mode all gate electrodes are at the same potential and charge is stored by the gate-drain capacitance. In the transfer mode, the potential on one gate is made large, compared to the potential on an adjacent gate, such that the potential barrier is lowered and charge flows from one source region to the adjacent drain in shift register fashion.

Semiconductor charge device shift registers are analog in nature, the quantity of stored charge corresponding to the amplitude of the signal. Such shift registers have been proposed for effecting analog matched filters. Reference, e.g., Sangster, "The 'Bucket Brigade Delay Line,' a Shift Register for Analog Signals," Phillips Tech. Rev., 31, 92 (1970).

An analog matched filter convolves an incoming signal with the impulse response of the filter. This convolution can be performed by applying the incoming signal to the input of a BB or CCD analog shift register, and forming a weighted summation of the charge at each stage of delay. In practice, the signal at each bit of the shift register is "tapped" or sampled and is "weighted" to produce an impulse response which is the Fourier Transform of a desired frequency characteristic. The weighting can also be used to improve sidelobe suppression. By way of example, where $h(t)$ is the impulse response of the filter and $q_i(t)$ is the charge on the $i^{th}$ delay stage of an N-stage charge transfer device analog shift register, then $$v_{out}(t) = 1/C_{EI}\, \Sigma^N h_i q_i^{(t)} \quad (1)$$

where C is the capacitance of each delay stage or bit, and the $h_i(i = 1, \ldots N)$ are the weights of each delay stage which determine the impulse response of the filter.

To date, a major problem in providing a charge transfer device analog matched filter pertains to the difficulty in "tapping," i.e., measuring the charge present at each stage of delay and weighting this measured signal with a preselected value of unity or less. One technique for effecting this in a BB analog matched filter is to measure the voltage on each bucket with an integrated source follower amplifier. In this technique each bucket has its own amplifier,and all of the amplifiers are integrated monolithically on the chip with the BB. The weighted summation is accomplished by applying the outputs of the source followers to an external differential amplifier. All of the positively weighted outputs are summed together, as are the negatively weighted outputs. The differential amplifier performs the subtraction of the summed positively and negatively weighted outputs to provide the desired weighted summation of charge at each stage of delay.

This technique works well with BB configurations, producing a non-transient output. Tap weightings are adjusted simply by varying the appropriate tap load resistances. Hence, one BB matched filter can easily be altered to many different filter requirements without mask redesign. A major disadvantage of the technique is the fact that it cannot be used with CCDs because they have no diffusions from which a voltage may be sampled at each stage of delay. A further disadvantage is the fact that the capacitive loading of the source followers at each bucket limits the minimum size per bit of the BB shift register. Additionally, the BB shift register and associated bucket source follower amplifiers are somewhat unwieldy in assembly.

Accordingly, an object of the invention is an improved charge transfer device analog matched filter.

A further object of the invention is an improved circuit configuration for measuring the amount of charge stored at each delay stage of a charge transfer device analog shift register and weighting the tapped signal by a preselected value.

An additional object of the invention is a bridge detector for measuring the charge stored at each delay stage in a charge transfer device analog matched filter.

Yet another object of the invention is the provision of a bridge detector for a charge transfer device analog matched filter which does not limit the individual BB or CCD bit size.

Still another object of the invention is the provision of a bridge detector for measuring charge stored at each delay stage of a charge transfer device analog matched filter, which detector is compatible with integrated circuit fabrication techniques, contributing to circuit complexity only in the requirement of one additional clock line.

Briefly, in accordance with the invention, there is provided a "bridge detector" for measuring the charged stored in each delay stage of a charge transfer device analog matched filter, and weighting the detected signal by a preselected value. The detector may advantageously be utilized with both CCD and BB configurations. Output can be either transient or non-transient in nature, as desired. The detector utilizes the fact that the charging current in the clock line supplies of charge transfer devices is proportional to the signal charge being transferred. Par of the charging current is not due to signal charge; this contribution is constant and is advantageously nulled out by the detector.

More particularly, one clock line of the BB or CCD configuration is used for sensing the stored charge. Each gate connected to this clock line (one gate per bit) is split into two separate portions, the relative area of one portion to the other defining the weighting value of that bit. The clock phase used for sensing is split into two separate clock lines operating in parallel. Both of these clock lines are driven by a single clock generator, each through an impedance. The separate portions of each gate are respectively connected to the separate clock lines. A high gain differential amplifier detects the differential voltage across the two portions of the split clock line, in essence defining an AC bridge configuration.

In a preferred embodiment a semiconductor charge transfer device analog matched filter is integrated on a semiconductor substrate. The filter includes a plurality of delay stages, and an input signal in the form of semiconductor charge is transferred into respective delay stages via shift register fashion utilizing multi-phase clocks and transfer or gate electrodes. The amount of charge stored at each stage is tapped or measured, and is weighted with a value of unity or less. The value of the stored charge is tapped by measuring the amount of clock current required, responsive to the signal stored therein, to charge the electrode to a reference value. Weighting is effected by splitting the gate or transfer electrode associated with one clock phase in each delay stage into two spaced apart portions. The amount of polarity of weighting is determined by the relative area ratio of the two portions. The clock phase associated with the electrode used for weighting is split into two portions for respectively summing the positive and negative weighted portions. One of the clock lines is connected to the positive portions of all of the split electrodes and the other is commonly connected to the negative portions of all of the weighted electrodes. The two clock lines are connected to the clock phase source through preselected impedance. A differential amplifier connected across the split clock lines is effective to simultaneously measure the differential voltage thereacross produced by the summed positive and negative currents. A correlated output is generated whenever the signals stored in the respective delay stages "match" the filter impulse response defined by the weighted electrodes. A capacitor connected to one input to the differential amplifier is effective to null out the charging current initially required to charge the delay stage to a reference value, so that the differential amplifier measures only the current associated with the signal.

Other objects and advantages of the invention will be apparent upon reading the following detailed description of illustrative embodiments in conjunction with the drawings wherein.

Figure 1:
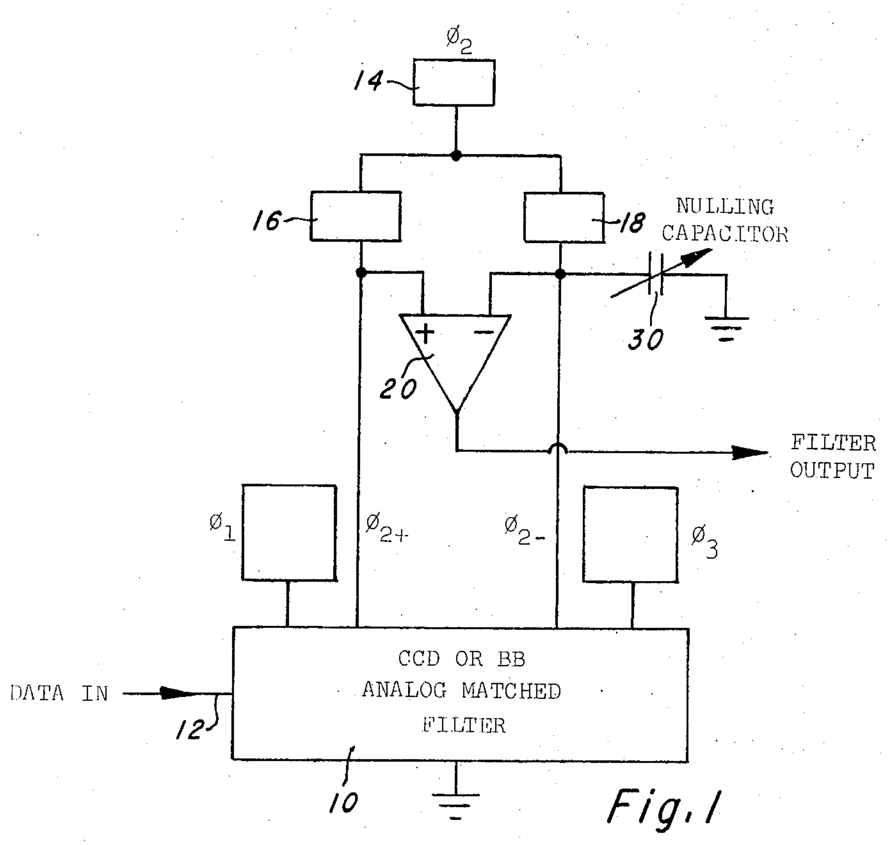
FIG. 1 is a block diagram illustration of the bridge detector in accordance with the present invention.

With reference now to the drawings, and for the present to FIG. 1, a charge transfer device analog matched filter in accordance with a preferred embodiment of the invention is illustrated. A semiconductor charge transfer device analog delay line is illustrated generally at 10. The analog delay line 10 may comprise either a CCD or BB configuration. Such delay lines and methods of fabrication thereof are well known in the art and need not be further explained herein. Input data is entered into the delay line in shift register fashion at 12 by conventional techniques. As illustrated in FIG. 1, a three phase clocking system comprising clock lines $\phi_1$, $\phi_2$, and $\phi_3$ is utilized. Other polyphase clocking techniques can of course be utilized. For example, with BB configurations, a two phase clock is typical.

In accordance with the charge detector configuration of the present invention, one of the clock lines is chosen for sensing the amount of charge present at each bit of the delay line. As noted previously, the charging current in the clock line supplies of CCDs and BBs is proportional to the signal charge being transferred. Thus, the sum of the total amount of charge that transfers under all of the gates in the charge transfer device analog matched filter shift register structure can be sensed in the clock lines. In the preferred embodiment, only one clock line ($\phi_2$ in FIG. 1) is selected for the sensing function. It is understood of course that all clock lines could be used with the outputs multiplexed to provide an essentially continuous output.

Figure 3:
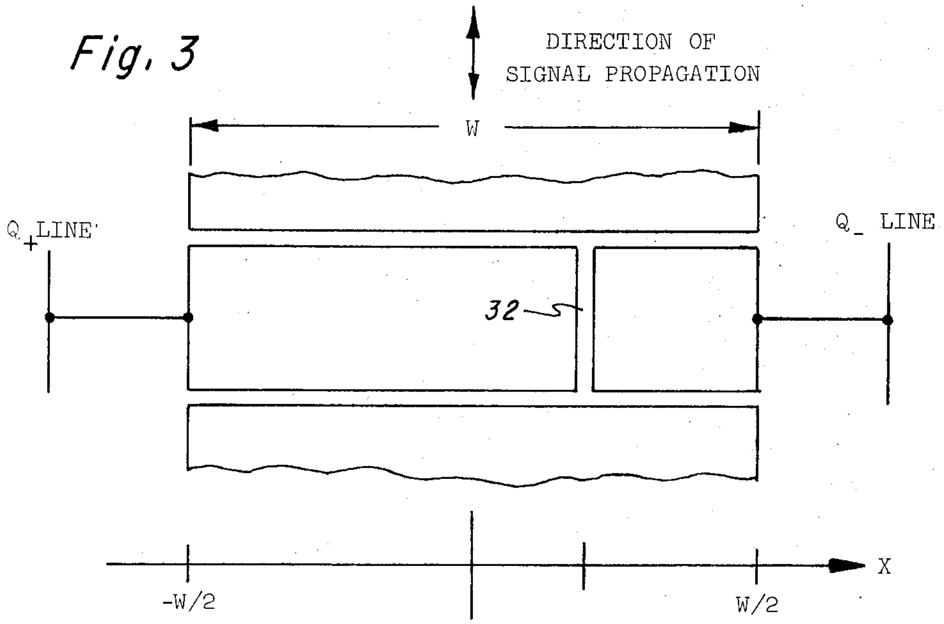
FIG. 3 is a plan view of a split gate electrode suitable for use with the bridge detector of the present invention.

Again with respect to FIG. 1, clock line $\phi_2$ is split into two parallel operating portions, $\phi_{2+}$ and $\phi_{2-}$. These two portions are driven from a single $\phi_2$ clock generator 14. Each of the lines $\phi_{2+}$ and $\phi_{2-}$ are driven through an impedance, 16 and 18 respectively. As will be explained in greater detail hereinafter, the impedances 16 and 18 may be resistive, capacitive, or a combination thereof. A high gain differential amplifier 20 senses the differential voltage across the two split clock lines $\phi_{2+}$ and $\phi_{2-}$. The nature of this differential voltage will be more apparent in the discussion below of FIGS. 2 and 3. The differential amplifier should have on the order of 60–80 db common mode rejection. Suitable amplifiers include Texas Instruments Incorporated units SN 52558 and SN 72558 and similar units.

Figure 2:
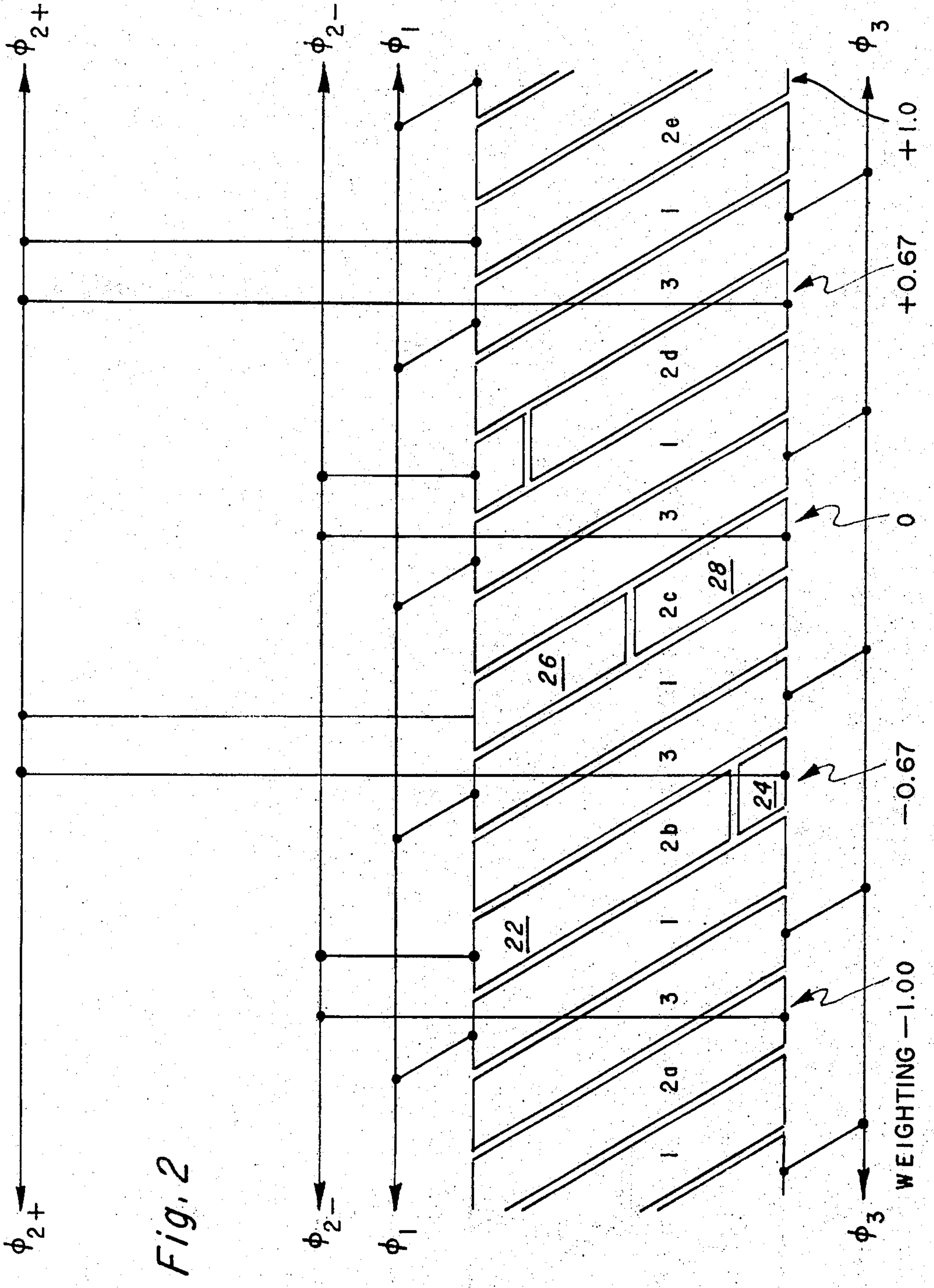
FIG. 2 is a plan view of a portion of a CCD analog matched filter showing connection of split clock lines to split gate electrodes to define weighting.

With reference to FIG. 2 there is illustrated suitable connection of the split clock lines $\phi_{2+}$ and $\phi_{2-}$ to a CCD analog matched filter in a configuration so as to obtain weighted "tapped" signals. A three phase embodiment is shown wherein respective bits of the CCD are defined by respective sets of the three electrodes 1, 2, and 3. Signal weighting is effected by electrode 2 in each bit. By way of example, electrode 2*a* is a continuous conductive strip and is connected only to $\phi_{2-}$. This electrode defines a weighting of −1.0. With respect to electrode 2b, it will be noted that this electrode is split into two separate portions 22 and 24. Portion 22 is connected to clock $\phi_{2-}$. The relative areas of portions 22 and 24 defines a signal weighting of −0.67. With respect to electrode 2c it will be seen that this electrode is split into separate equal portions 26 and 28. Portion 26 is connected to $\phi_{2+}$ while portion 28 is connected to $\phi_{2-}$. Since the portions 26 and 28 are equal in area, there will be no differential voltage therebetween and hence the signal is weighted with a zero. Similarly, electrodes 2*d* and 2*e* are configured to define weighting factors of +0.67 and +1.0 respectively.

It can be seen that a configuration of split gate electrodes and split clock lines similar to that illustrated in FIG. 2 is effective to provide an analog matched filter output. Particularly with reference to FIG. 3, consider the charging current in the $i^{th}$ gate. Total gate separation is W with weighting on this gate being $h_i$. The corresponding gate separation position $S_i$ is located at $$S_i = 1/2Wh_i \quad (2)$$

The charging current $i$ for the gate is the sum of signal current $i_s$ plus a fixed charging current I necessary to charge the bucket or well without signal, and can be written as $$i = i_s + I \quad (3)$$

Because the gate is split at $S_i$, then $(1/2 + S/W\ i)\ i$ of the current will flow in the positively weighted clock line $\phi_{2+}$, and $(1/2 - S_i/W)\ i$ will flow in the negatively weighted line $\phi_{2-}$. Total current is still $$i = i\ [\ (1/2 + Si/W) + (1/2 - Si/W)\ ]$$

Defining $$i_+ = (1/2 + Si/W)i \quad (4)$$

and $$i_- = (1/2 - Si/W)i \quad (5)$$

the voltage present at the input of the differential amplifier 20 (FIG. 1) due to this single gate is $$v(t) = (E - Zi_-) - (E - Zi_+) \quad (6)$$

$$= Z(i_+ - i_-) \quad (7)$$

$$= 2Zih_i \quad (8)$$

$$= Zh_ii_s + Zh_iI \quad (9)$$

where E is the clock voltage and Z is the impedance. The second term in Equation (9) is constant. Thus the contribution from all of the gates will be $$v(t) = \sum_{i-i}^{N} Zh_ii_si + \text{constant} \quad (10)$$

Equation (10) is roughly in the same form as Equation (1) showing that the split gate bridge detection configuration provides an output with the proper summing and weighting. The detailed nature of the output voltage is, of course, dependent upon the nature of the impedance Z and the time dependence of the clocking waveforms. The constant in equation (10) can be nulled out by adding an external capacitor 30 (FIG. 1) to the one side or the other of the differential amplifier to balance out the capacitance in the lower half of the bridge, or to account for minor imbalance in the Z values. The nulling capacitance should be added to the side which has the lowest total gate capacitance.

The impedance Z can range either from a small resistance of approximately 50 ohms or so, to a fairly large capacitance as compared to total gate capacitance so that most of the voltage is dropped across the gates. Various RC combinations can also be used. Generally, a pure R will give a transient output, and a pure C will give an integrated transient output.

The gap 32 between the split gates should be large enough to prevent charge transfer laterally, although the difference in potential between the gate halves typically is only on the order of a hundred millivolts or so out of approximately 10 volts.

Figure 4:
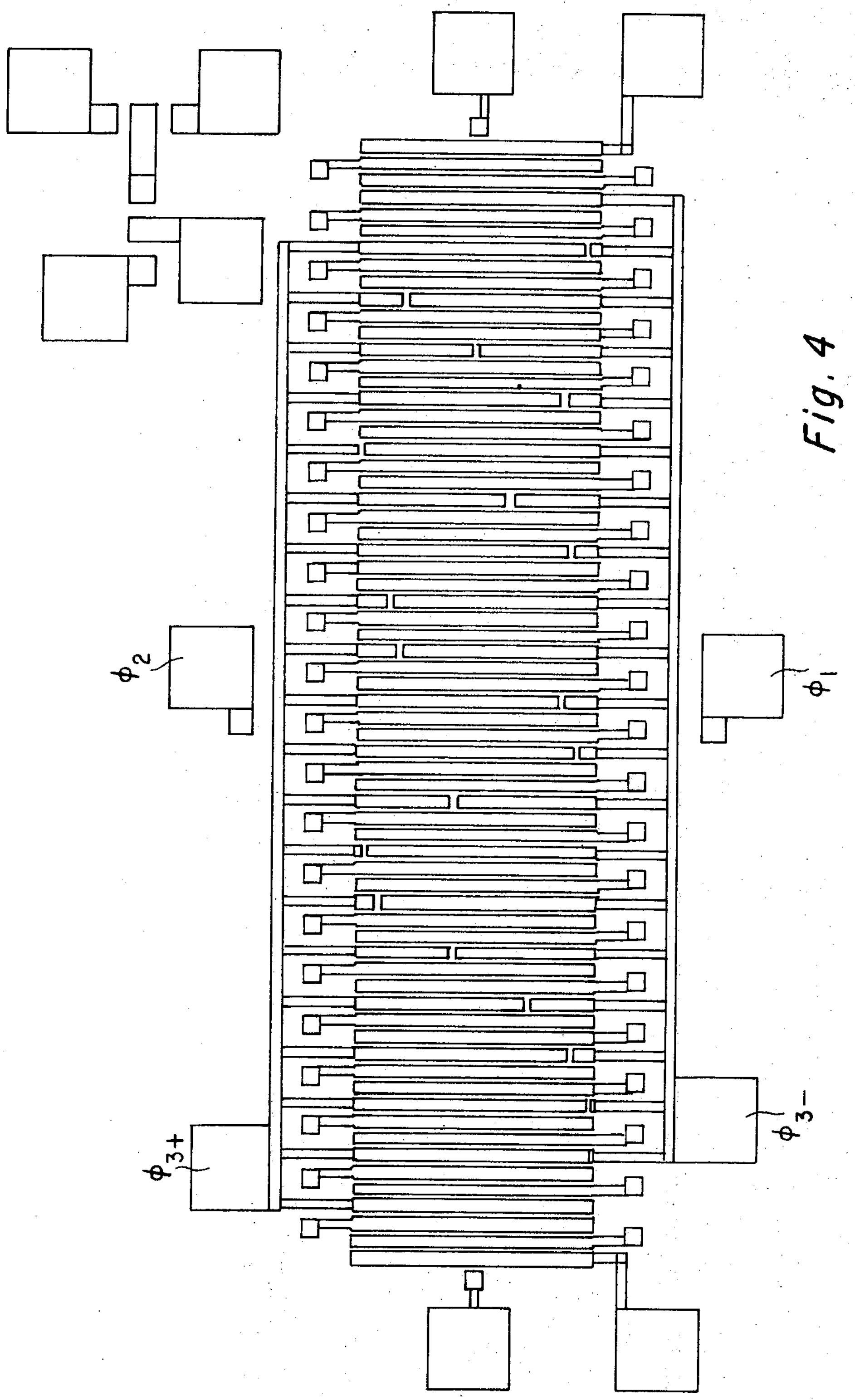
FIG. 4 is a plan view layout of a CCD linear F.M. filter and associated bridge detector in accordance with the invention.

With reference to FIG. 4, a plan view of an integrated CCD linear FM filter is illustrated wherein clock line $\phi_3$ is split and corresponding $\phi_3$ gates are split to effect weighting corresponding to a linear FM signal.

While the present invention has been described with reference to specific embodiments, it will be apparent to those skilled in the art that various changes may be made without departing from the spirit or scope of the invention.

What is claimed is:

1. An analog matched filter comprising:

a semiconductor substrate; an insulating layer on said substrate; a multiphase clock charge transfer device analog shift register on said substrate defining a plurality of delay stages; means for applying input signals to said shift register for storage as electrical charge in successive ones of said delay stages; each said delay stage having a plurality of electrodes separated from said substrate by said insulating layer, at least one said electrode of each stage defined by first and a second spaced portions so dimensioned relative to each other to define a selected weighting factor such that the weighting factors of all said stages in combination define a preselected filter impulse response matched to a predetermined input signal; clock pulse generator means for generating multiphase clock pulses; means connecting said clock pulse generator means to said electrodes for application of clock pulses thereto for shifting said input signals between said delay stages, said clock pulses supplying charging current to said electrodes of each stage dependent on the magnitude of signal charge stored at that stage;

said connecting means including a first clock line connected to all said first electrode portions and a second clock line connected to all said second electrode portions; and detector means comprising a differential amplifier connected across said first and second clock lines for detecting differential voltage thereacross produced responsive to application of clock pulses to said electrode portions.

2. An analog matched filter as set forth in claim 1 including nulling means connected to said differential amplifier wherein said differential amplifier measures only differential voltage produced across said first and second clock lines in response to the signal charge in each of said delay stages.

3. An analog matched filter as set forth in claim 2 wherein said nulling means comprises a capacitor connected between one of said first and second clock lines and a circuit ground.

4. In a charge transfer device analog matched filter integrated on a semiconductor substrate having an insulating layer on one surface thereof, a plurality of delay stages disposed adjacent to said one surface, each said delay stage including spaced apart electrodes on said insulating layer; means for applying input signals to an input of said filter for storage in delay stages thereof as electric charge dependent on input signal amplitude; and clock pulse generating means for applying clock pulses of different phases to said electrodes of each stage to shift said stored charges between said delay stages from said input to an output of said filter said clock pulses supplying charging current to said electrodes related to charge stored at that stage; bridge detector means comprising:

a. contact means on said substrate for receiving one phase of said multiphase clock pulses;

b. first and second clock lines each connected to said contact means through a respective preselected electrical impedance;

c. said electrodes in each of said delay stages including weighting means defined by an elongated electrode having two spaced apart portions defining its elongate dimension, the dimension ratio between said electrode portions defining a weighting function of unity or less, one of said electrode portions defining positive weighting and the other portion defining negative weighting; means connecting said one portions of all said weighting electrodes in common to said first clock line; means connecting the said other portions of all said weighting electrodes in common to said second clock line; said first clock line effective to sum all of the positively weighted signal-related charging currents and said second clock line effective to sum all of said negatively weighted signal-related charging currents; and d. means connecting a differential amplifier across said first and second clock lines for generating an output signal responsive to differential in voltages developed across said impedances by said summed currents.

5. A semiconductor charge transfer device analog matched filter having a plurality of delay stages defined at one surface of a semiconductor substrate covered by insulating layer, each delay stage including spaced apart electrodes on said insulating layer; means for applying input signals to said filter for storage as electrical charge in successive ones of said delay stages; multiphase clock pulse generating means connected to said electrodes for effecting transfer of said stored charge between said delay stages; in each said delay stage one of said electrodes including first and second spaced apart portions having respective areas, the ratio of the area of said first electrode portion to that of said second electrode portion in each stage defining a selected weighting factor for that stage not greater than unity; a first clock line connecting all said first electrode portions and a second clock line connecting all said second electrode portions; respective first and second impedance means connecting said first and second clock lines to one phase of said multiphase clock pulse generator means for applying charging current to said first and second electrode portions, said charging currents supplied to said first and second electrode portions of each stage having a magnitude equal to the sum of a reference current and a current dependent on the signal charge stored at that stage, said charging currents causing respective voltage drops across said first and second impedances dependent on the sums of said currents supplied to the first electrode portions and to the second electrode portions respectively; and means connected to said first and second clock lines for detective differential in said voltage drop across said first and second impedances to provide a correlated output signal responsive to a said input signal which is matched with said filter impulse response.

6. A semiconductor charge transfer device according to claim 5, including nulling means connected to said differential detective means for eliminating the effects of said reference currents from said differential voltage measurement.

7. A semiconductor charge transfer device according to claim 5, wherein said detection means comprises an integrated circuit high gain differential amplifier, and means connecting said first and second clock lines to respective non-inverting and inverting inputs of said amplifier.

8. A semiconductor charge transfer device according to claim 7, further including a nulling capacitor connected to one of said first and second clock lines for eliminating effects of said reference currents on the output of said amplifier.

* * * * *